United States Patent [19]

Fedor et al.

[11] Patent Number: 5,398,239
[45] Date of Patent: Mar. 14, 1995

[54] CROSSPOINT ANALOG DATA SELECTOR

[75] Inventors: Chester Fedor, Groton; Kevin C. Fitzpatrick, New London, both of Conn.

[73] Assignee: The United States of America as represented by the Secretary of the Navy, Washington, D.C.

[21] Appl. No.: 169,923

[22] Filed: Dec. 8, 1993

[51] Int. Cl.⁶ .................. H04Q 3/00; H04Q 11/04
[52] U.S. Cl. .................. 370/58.2; 370/65.5; 370/110.1; 340/825.79; 379/291; 379/335
[58] Field of Search .......... 370/53, 58.1, 58.2, 370/58.3, 60, 60.1, 85.1, 85.2, 65.5, 94.1, 56, 54, 110.1; 340/825.06, 825.5, 825.51, 825.79, 825.8; 379/268, 269, 290, 291, 333, 334, 335

[56] References Cited

U.S. PATENT DOCUMENTS

| | | | |
|---|---|---|---|
| 4,495,615 | 1/1985 | Wilcke | 370/58.1 |
| 4,750,202 | 6/1988 | Feldman et al. | 379/335 |
| 4,968,977 | 11/1990 | Chinnaswamy et al. | 340/825.8 |
| 5,043,978 | 8/1991 | Nagler et al. | 370/58.2 |
| 5,072,217 | 12/1991 | Georgiou et al. | 340/825.79 |

*Primary Examiner*—Alpus Hsu
*Attorney, Agent, or Firm*—Michael J. McGowan; Prithvi C. Lall; James M. Kasischke

[57] ABSTRACT

A crosspoint analog data selector for coupling data received on a predetermined number of input channel lines onto a predetermined lesser number of output channel lines. The crosspoint analog data selector includes a selector section and a control section. The selector section includes two or more crosspoint switch sections, each crosspoint switch section including a predetermined number of input terminals and a predetermined number of output terminals. Each output terminal is individually energizable. Each input terminal is connected to a different input channel line, such that none of the input channel lines are connected to input terminals of multiple crosspoint switch sections. Each output terminal is connected to one of the output channel lines such that each output channel line is connected to an output terminal of each of the crosspoint switch sections. The control section is responsive to commands to enable the selector section to couple data from a selected input channel line to a selected output channel line. In that operation, the control section (i) initially enables the crosspoint switch sections to de-energize their output terminals connected to the selected output channel line, (ii) enables the crosspoint switch section connected to the selected input channel line to connect its input terminal connected thereto to its output terminal connected to the selected output channel line, and (iii) enables the crosspoint switch section connected to the selected input channel line to energize its output terminal connected to the selected output channel line.

6 Claims, 4 Drawing Sheets

CROSSPOINT ANALOG DATA SELECTOR

STATEMENT OF GOVERNMENT INTEREST

The invention described herein may be manufactured by or for the Government of the United States of America for Governmental purposes without the payment of any royalties thereon or therefor.

BACKGROUND OF THE INVENTION

1. Field of the Invention

The invention relates generally to the field of data acquisition systems and more particularly to systems for selecting a subset of analog inputs that are received from a plurality of analog inputs, including multiples of the same input, to be provided to a digital computer in order to perform computer analysis and data interpretation.

2. Description of the Prior Art

In many circumstances, it is necessary to couple data from an external source to a digital computer system for processing and analysis. Typical computer systems include data input terminals which facilitate reception of data on a selected number of input channels, typically eight, and it is often expensive to redesign such computers to enable them to receive data on more than that number of channels.

SUMMARY OF THE INVENTION

The invention provides a new and improved crosspoint analog data selector to facilitate coupling of data received from one or more data sources over selected number of channel lines to a device that can only receive data over a lesser number of input channels.

In brief summary, the crosspoint analog data selector couples data received on a predetermined number of input channel lines onto a predetermined lesser number of output channel lines. The crosspoint analog data selector includes a selector portion and a control portion. The selector portion includes two or more crosspoint switch sections, each crosspoint switch section including a predetermined number of input terminals and a predetermined number of output terminals. Each output terminal is individually energizable. Each input terminal is connected to a different input channel line, such that none of the input channel lines are connected to input terminals of multiple crosspoint switch sections. Each output terminal is connected to one of the output channel lines such that each output channel line is connected to an output terminal of each of the crosspoint switch sections. The control portion is responsive to commands to enable the selector portion to couple data from a selected input channel line to a selected output channel line. In that operation, the control portion (i) initially enables the crosspoint switch sections to de-energize their output terminals connected to the selected output channel line, (ii) enables the crosspoint switch section connected to the selected input channel line to connect its input terminal connected thereto to its output terminal connected to the selected output channel line, and (iii) enables the crosspoint switch section connected to the selected input channel line to energize its output terminal connected to the selected output line.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DESCRIPTION OF THE PREFERRED EMBODIMENT

Figure 1:
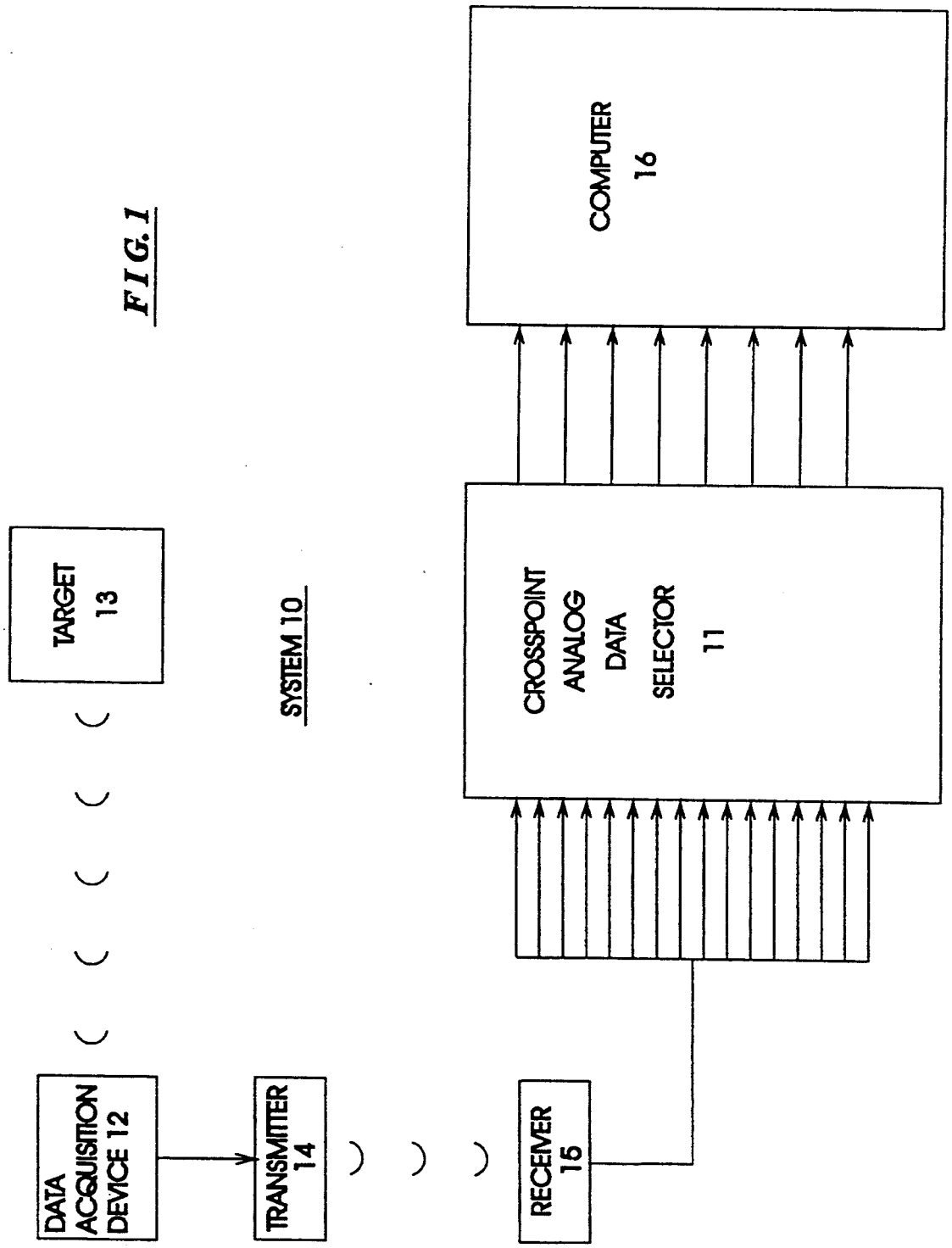
FIG. 1 is a functional block diagram of a data acquisition and analysis system including a crosspoint analog data selector constructed in accordance with the invention.

FIG. 1 is a functional block diagram of a data acquisition and analysis system 10 including a crosspoint analog data selector 11 constructed in accordance with the invention. With reference to FIG. 1, analog data acquisition devices 12 that are part of this system 10 receive analog data. In one particular embodiment, the analog data acquisition devices are sonobouys that receive analog data in the form of acoustic energy generated by a particular target 13. The sonobouys process the signals and then transmit them through a transmitter 14. The signals are received by a receiver 15. The receiver 15 couples the received signals to the crosspoint analog data selector 11, which selects among a number of inputs provided by the receiver 15 to provide data to be coupled to a computer 16 that will perform data analysis and interpretation. In one particular embodiment the receiver 15 provides sixteen inputs to the crosspoint analog data selector 11, and the crosspoint analog data selector 11 selectively couples up to eight of the inputs to the computer 16. The particular inputs from the receivers 15 that are selected to be coupled to the computer 16 is determined in response to commands provided by the computer 16.

Figure 2A:
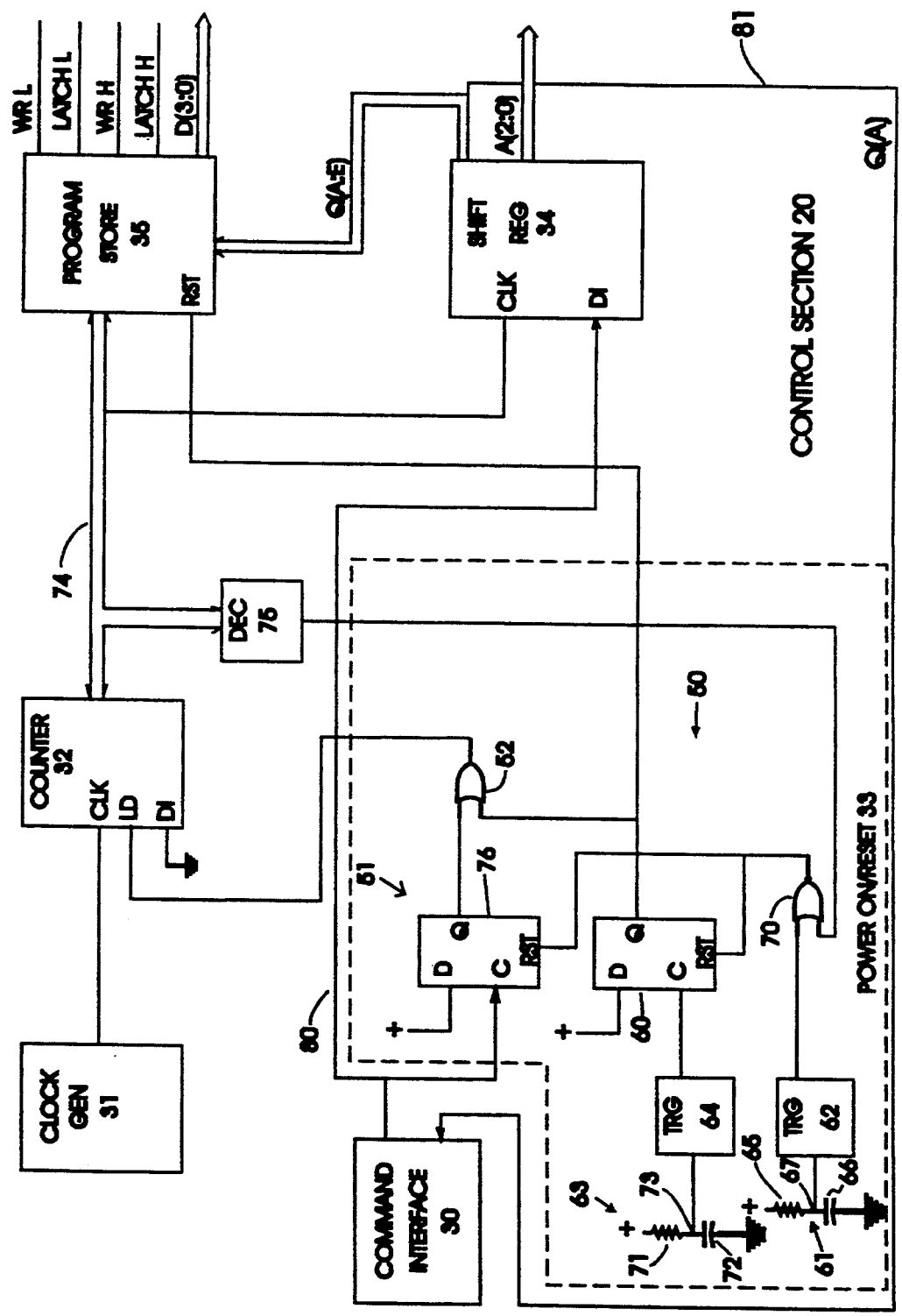
FIGS. 2A and 2B jointly comprise a block diagram of the crosspoint analog data selector constructed in accordance with the invention.
Figure 2B:
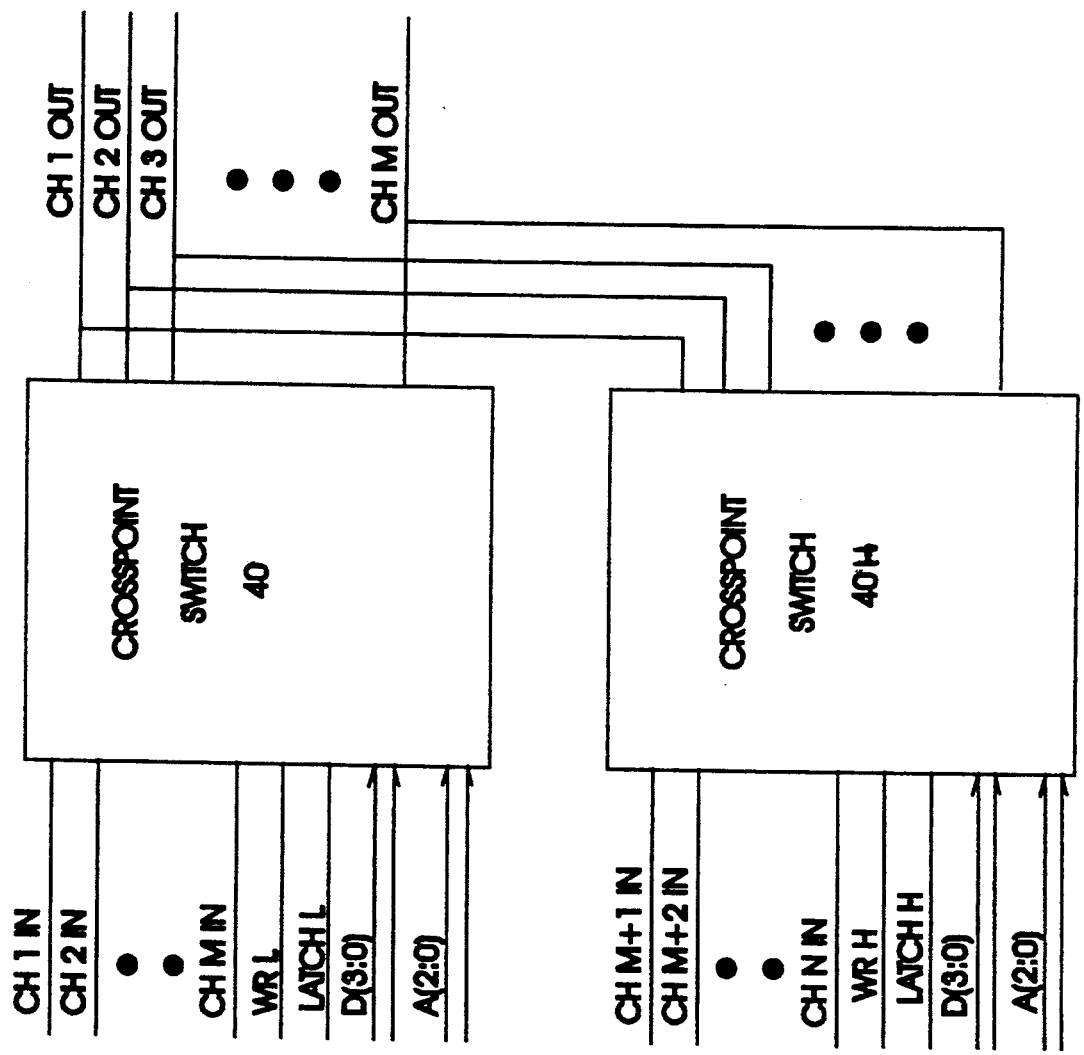

A detailed functional block diagram of the crosspoint analog data selector 11 is depicted in FIGS. 2A and 2B. With reference to FIGS. 2A and 2B, the crosspoint analog data selector includes two major sections, including a control section 20, which is shown in detail in FIG. 2A, and a selector section 21, which is shown in detail in FIG. 2B. With reference to FIG. 2B, the selector section 21 is connected to receive the analog data signals on respective input lines CH 1 IN through CH N IN from the receiver 15 and, under control of the control section 20, couple data signals from selected input lines onto selected one of a plurality of output lines CH 1 OUT through CH M OUT.

The control section 20 controls the selector section 21 in response to commands it receives from the computer 16 through a command interface 30. In one particular embodiment, the command interface 30 is in the form of an RS-232 interface device, which receives bits comprising the command in serial format. In addition to the command interface 30, the control section 20 includes a clock generator 31, a counter section 32, a power on/reset section 33, a shift register 34 and a program store 35. The shift register 34 generally converts serial commands as received by the command interface 30 into parallel format for use by the program store 35, except for power on/reset commands which are initiated by the power on/reset section 33. The clock generator 31 generates clocking signals which clocks the counter section 32, which, in turn, generates count signals for stepping the program store through successive steps of a program. The, power on/reset section 33, in response to a power on/reset resets the counter 32 and program store 35 to initialize their operations in response to a new command sequence. The program store 35 and shift register 34 both generate control signals for controlling the selector section 21. In particular, the shift register 34 provides signals identifying particular input lines and output lines to the selector section, and the program store 35 provides control signals indicating operations to be performed in connection therewith.

With reference to FIG. 2B, the selector section 21 comprises two "M"-by-"M" cross-point switch sections 40H and 40L. Low-order crosspoint switch section 40L receives input signals from the receiver 15 (FIG. 1) on low-order input channel lines CH 1 IN through CH M IN (generally identified as "CH i IN" lines, "i" being an index from 1 through M), and, under control of a WR L write low control signal, a LATCH L latch low control signal, D(3:0) data signals and A(2:0) address signals, selectively couples signals from those input channel lines onto selected ones of output channel lines CH 1 OUT through CH M OUT (generally identified as "CH j OUT" lines, "j" being an index from 1 through M). Similarly, high-order crosspoint switch section 40H receives input signals from the receiver 15 (FIG. 1) on high-order input channel lines CH M+1 IN through CH N IN (generally identified as "CH i IN" lines, "i" being an index from "M+1" through N), and, under control of a WR H write high control signal, a LATCH H latch high control signal, D(3:0) data signals and A(2:0) address signals, selectively couples signals from those input channel lines onto selected ones of the CH j OUT output channel lines. The WR H, WR L, LATCH L and LATCH H control signals, along with the D(3:0) data signals, are provided by the program store 35, and the A(2:0) address signals are provided by the shift register 34.

In one particular embodiment, each crosspoint switch section 40H and 40L is a MAX 456 crossbar switch sold by Maxim Corporation. Each crosspoint switch section 40H and 40L receives at one input terminal one of the input signals on the input channel line CH i IN connected thereto, as identified by the low-order D(2:0) data signals, and is enabled to couple the input signal onto the output line CH j OUT identified by the A(2:0) address signals. In addition, each crosspoint switch section 40H and 40L can be enabled to turn on and off individual ones of its output terminals, as identified by the A(2:0) address signals, by particular encodings of the D(3:0) data signals. If the D(3) signal is asserted, the crosspoint switch section 40H/L enabled by the corresponding WR H/L and LATCH H/L signals will perform a 14 turn on or turn off operation, as identified by the particular encoding of the D(2:0) signals, in connection with its output terminal identified by the A(2:0) address signals. On the other hand, if the D(3) signal is negated, it will effectively connect its input terminal identified by the D(2:0) data signals to the output terminal identified by the A(2:0) address signals.

The output terminal on/off operation may be separately enabled with respect to each output terminal, and the input-output terminal connection operation may be enabled separately with respect to each pair of input and output terminals on a crosspoint switch section 40H and 40L, and the crosspoint switch section 40H and 40L, will maintain its on or off condition and connection condition in connection with each pair of input and output terminals until it is changed. The WR H/L and LATCH H/L signals enable the respective crosspoint switch sections 40H and 40L to latch and maintain the respective output terminal on/off condition and input-output terminal connection condition. It will be appreciated that the crosspoint switch section 40L can turn on and off any of its output terminals, and can also connect any of its input terminals to any of its output terminals, effectively coupling signals from any of the CH i IN output lines ("i" from 1 to M) to any of the CH j OUT output lines ("j" from 1 to M). Similarly, crosspoint switch section 40H can turn on and off any of its output terminals, and can also connect any of its input terminals to any of its output terminals, effectively coupling signals from any of the CH i IN output lines ("i" from M+1 to N) to any of the CH j OUT output lines ("j" from 1 to M). Accordingly, the selector section 21 will enable an efficient selective and variable coupling of signals from N input lines to M output lines, where "M" is less than "N," for use by the computer 16 (FIG. 1).

Before proceeding further, it would be helpful to describe the structures of the commands that are processed by the crosspoint analog data selector 11. In particular, the crosspoint analog data selector 11 processes two general types of commands, namely on/off commands and input/output commands. An on/off command includes a high/low portion identifying the crosspoint switch section 40L or the crosspoint switch section 40H, an output address portion which acts as an output line identifier, a command portion which has encodings separately identifying an on function or an off function, and a command mode identifier portion which identifies the command as being an on/off command. In response to an on/off command, the high- or low-order crosspoint switch section 40H or 40L, as indicated by the high/low portion of the command, will turn its output line, as identified by the output address portion, on or off, as identified by the command portion. An input/output command also includes a high/low portion, an output address portion, and a command mode identifier portion, which comprises the same command fields as the on/off command. Instead of the command portion, an input/output command has an input address portion, and, in response to an input/output command the control section enables the identified crosspoint switch section 40H or 40L to couple the signal received through its input terminal as identified by the input address portion, to the output line identified by the output address portion.

More specifically, with reference to FIG. 2A, the command input is received from the computer 16 at the command interface 30, which includes in one embodiment an RS-232 terminal which couples the received signal to a 1489 converter (not shown) which converts the RS-232 command signals to TTL logic voltage levels. The command input data from the command interface is sent to both the shift register section 34, which is comprised of a 74164 shift register, and the power on/reset section 33. As will be described below, the command, which is serially received through the command interface 30, is converted to parallel form by the shift register 34. As the bits of the command are received, they are echoed back to the command interface 30, converted from TTL logic voltage levels to RS-232 voltage levels by a 1488 converter (not shown)

in the command interface 30, and echoed back to the command source which in one embodiment is computer 16.

The power on/reset section 33 initializes the counter section 32 and the program store 35 in response to (1) an initial power-on condition, when power is first applied to the crosspoint analog data selector 11, and (2) the start of a new command. The power on/reset section 33 includes a power on initialization section 50, which senses a power on condition and generates a power on initialization signal in response thereto, and a command initialization section 51, which generates a new command initialization signal in response thereto. Both the power on initialization signal and the new command initialization signal are coupled to an OR gate 52, which generates a composite initialization signal or pulse that is coupled to the load terminal LD of the counter 32. As shown in FIG. 2A, the counter's data in terminals DI are connected to ground, and so when the OR gate 52 generates a pulse, the counter 32 loads a value "zero", thereby creating the initialization condition.

The power on initialization section 50 includes a flip-flop 60, a first voltage integration circuit 61 coupled to a trigger circuit 62, and a second voltage integration circuit 63 connected to a second trigger circuit 64. Voltage generation circuit 61 comprises a circuit consisting of a resistor 65 and a capacitor 66 serially connected between the power supply (indicated by "+" in FIG. 2A) and ground. The node 67 between the resistor 65 and capacitor 66 provides an input signal to the trigger circuit 62. The trigger circuit 62 is a Schmitt trigger, which generates a pulse when the voltage level at node 67 reaches a predetermined level. When power is first turned on, the capacitor 66 is charged through the resistor 65, at a rate determined by the RC time-constant of the circuit 61. When the voltage level of node 67 reaches the aforementioned predetermined level, the trigger circuit 62 generates the pulse, which is coupled through a NOR gate 70 to the reset terminal RST of the flip-flop 60, which conditions the flip-flop 60 to a reset condition. It should be noted that the output of NOR gate 70 also is coupled to the command initialization section 51, in particular to a flip-flop 76, to condition that section 51 to a reset condition.

The voltage integration circuit 63 also comprises a circuit consisting of a resistor 71 and a capacitor 72 serially connected between the power supply (indicated by "+" in FIG. 2A) and ground. The node 73 between the resistor 71 and capacitor 72 provides an input signal to the trigger circuit 64. The trigger circuit 64 is also a Schmitt trigger, which generates a pulse when the voltage level at node 73 reaches a predetermined level. When power is first turned on, the capacitor 72 is charged through the resistor 71, at a rate determined by the RC time-constant of the circuit 63. The capacitance of capacitor 72 and resistance of resistor 71 are selected so that the RC time-constant of circuit 63 is greater than the RC time-constant of circuit 61, so that the voltage level of node 73 rises at a smaller rate than that of node 67. When the voltage level of node 73 reaches the aforementioned predetermined level, the trigger circuit 64 generates the pulse, which is coupled to the clock input terminal "C" of the flip-flop 60. The data input terminal of flip-flop 60 is connected to the positive power supply, so that when the pulse from trigger 64 is generated the flip-flop 60 will be conditioned to a set condition, enabling it to assert an output signal through its "Q" output terminal.

The asserted output signal at the Q output terminal of flip-flop 60 is coupled to the OR gate 52, which in turn generates a composite initialization signal or pulse that is coupled to the load terminal LD of the counter 32, enabling the counter 32 to load a value "zero", thereby creating the initialization condition. In addition, the asserted output signal from the Q output terminal of flip-flop 60 is coupled to the reset terminal RST of the program store 35. Asserting the RST terminal of the program store 35 initializes the selector section 21 by turning off all output terminals for both crosspoint switch sections 40L and 40H. This is the desired state after a power on condition.

After the counter 32 is reset by the power on reset signal from power on/reset portion 33, it will begin incrementing in response to successive ticks of a clock signal from the clock generator 31. The counter 32, which in one embodiment comprises two cascaded 74161 binary-encoded counter modules, generates a binary encoded count signal on a count bus 74. The signal on count bus 74 essentially provides a binary-encoded value identifying the number of ticks of the clock signal from clock generator 31 after the counter 32 has been reset. The count bus 74 couples the binary-encoded count signal to the program store 35, and also to a decoder 75. When the binary encoded count signal from counter 32 reaches a predetermined value, the decoder 75 generates an output signal that is coupled to the NOR gate 70. The output signal from the decoder 75 energizes the NOR gate 70, enabling it to generate an asserted output signal which again resets the flip-flop 60. The resetting of flip-flop 60 enables it to negate the output signal at its Q output terminal, thereby negating the reset signal at the program store 35, which will enable it to use subsequently-received commands as described below.

At this point, the command initialization section 51 portion of the power on/reset section 33 is in the reset condition, as enabled by the power on initialization section 50 as described above. Accordingly, the flip-flop 76 is clear, and so its Q output signal is negated. Since the flip-flop 60 in the power on initialization section 50 is also clear, so that its Q output signals is also negated, the OR gate 52 will at this point be de-energized. When the command interface 30 begins thereafter to couple an asserted signal onto line 80 representing a command, the signal is coupled to the clock input terminal of the flip-flop 76. The data input terminal of flip-flop 76 is connected to the positive power supply (as indicated by the "+" symbol), and so when the signal at the clock input terminal is asserted, the flip-flop 76 is set. The setting of flip-flop 76 enables it to generate an asserted output signal at its Q output terminal, which is coupled to a second input terminal of OR gate 52 thereby energizing the OR gate. The energized OR gate 52 provides an asserted output signal to reset the counter 32 as described above. The reset counter 32 thereupon begins to increment in response to successive ticks of the clocking signal received from the clock generator 31 as described above, with each incrementation generating output signals coupled onto the bus 74 representing successively higher binary-encoded values.

Line 80, which receives the command signals from the command interface 30, is also connected to the shift register 34, in particular to a data input terminal, thereby to couple the signal representing the serially-received bits of a command to the shift register 34. The shift register 34 also has a clock input terminal which is connected to a line in bus 74 which carries a signal that provides a leading edge (that is, the counter 32 shifts it from a negated state to an asserted state) in synchronism with the signal on line 80 representing a new bit of the command. Thus, the counter 32 enables the shift register 34 to latch each command bit successively received from the command interface. The shift register also has a Q(A) data output terminal connected to a line 81 that provides a signal to the command interface 30 that represents each command bit as it is received and latched; the command interface 30 can transmit the signal on line 81 to the computer 16 so that the computer can verify correct reception of each command bit by the crosspoint analog data selector 11. As the shift register 34 receives successive bits of the command, it converts it to parallel form, in the process generating Q(A:E) and A(2:0) output signals each representing the state of a bit of the command. In one particular embodiment, each command comprises eight bits, with the Q(A:E) signals representing the five high-order command bits and the A(2:0) output signals representing the three low-order command bits. The Q(A) signal, the high-order one of the Q(A:E) signals, represents the aforementioned high/low portion identifying one of the cross-point switch sections 40H or 40L, and the Q(E) signal represents the command mode portion identifying the command as an input/output command or an on/off command. If the Q(E) signal identifies the command as an on/off command, the remaining Q(B:D) signals constitute the on/off command indicating whether the identified crosspoint switch section's output line identified by the A(2:0) address signals provided by the shift register 34 is to be turned on or off. If the Q(E) signal identifies the command as an input/output command, the remaining Q(B:D) signals constitute the input address portion, identifying the input terminal of the one of the crosspoint switch section 40H or 40L that is identified by the Q(A) signal. The input terminal is then coupled to the output line identified by the output address portion defined by the A(2:0) address signals.

The binary-encoded signals on bus 74 from the counter 32 are also coupled to the program store 35, and control the operations of the program store through successive steps of receipt of a command by the shift register 34 and subsequent processing of the command, in particular, processing of the Q(A:E) signals after the entire command has been received by the shift register 34. The program store 35 uses the binary encoding of the signals on bus 74 to identify when the shift register 34 has received all of the bits of a command; since all commands comprise eight bits, the binary encoding will represent the same value for all commands. When the binary encoding of the signals on bus 74 reaches the predetermined value indicating that all of the command bits have been loaded into the shift register 34, the program store 35 decodes the Q(A:E) signals, representing the high-order bits of the command, and generates signals coupled onto the D(3:0) data lines for transfer to the selector section 21 (FIG. 2B).

The program store 35 uses the high-order Q(A) signal from the shift register 34 to identify the particular crosspoint switch portion 40H or 40L for which it is to assert control signals WR L write low, LATCH L latch low, WR H write high and LATCH H latch high in response to the command in the shift register 34, and it also uses the signals on bus 74, which continue to increment, to control timing with which it asserts the particular pairs of control signals WR L/LATCH L and WR H/LATCH H to enable the selected crosspoint switch section(s) to latch and establish the required output terminal on or off condition or input-output terminal connection condition. It will be appreciated that the particular control signals and the required timing sequence and protocol required for their assertion or negation will depend on the particular devices selected for the crosspoint switch sections 40H and 40L. In one embodiment, in which the crosspoint switch sections are both the aforementioned MAX 456 devices, the WR L/H write signal enables the crosspoint switch section 40L/40H to perform an initial loading of the D(3:0) data signals and the A(2:0) address signals, and the LATCH L/H latch signal enables the device to perform the operation specified by the D(3:0) and A(2:0) signals.

Returning to FIG. 2A, as the value of the binary encoding of the signals on bus 74 continues to advance, it will eventually reach the value that enables the decoder 75 to assert its output signal. The asserted output signal from decoder 75 energizes the NOR gate 70 in the power on/reset section 33, enabling it to, in turn, generate an asserted output signal which is coupled to the reset terminals of flip-flops 60 and 76. The resetting of flip-flop 76, in particular, places it in an initial condition to begin receiving signals on line 80 from the command interface 30 relating to the next command. These operations as described above are repeated for each command received by the crosspoint analog data selector 11.

Figure 3:
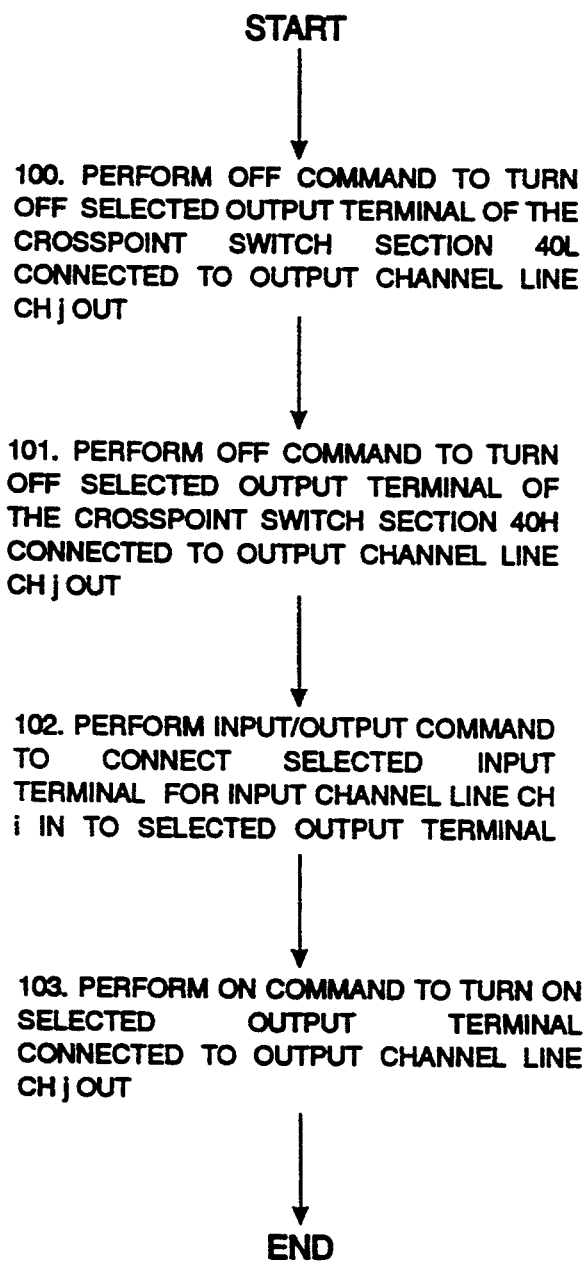
FIG. 3 is a flow chart detailing the operation of the crosspoint analog data selector depicted in FIGS. 2A and 2B in response to commands received thereby.

With this background, the operations performed by the crosspoint analog data selector in connection with processing commands to establish connections between selected input lines CH i IN (index "i" from 1 through N) and selected output lines CH j OUT (index "j" from 1 through M) will be described in connection with the flow chart in FIG. 3. At this point, it will be assumed that the crosspoint analog data selector 11 has been initialized, at least through the power on sequence described above. As noted above, the commands may be provided by the computer 16 which receives the data from the crosspoint analog data selector 11, or they may be provided by another command source (not shown). A single input/output command, received via the command interface 30, is required to connect input channel line CH i IN of the crosspoint analog data selector 11 to output channel line CH j OUT. This command is executed in four steps, as shown in FIG. 3, with the program store controlling the command sequence.

The first command step executed, comprising steps 100 and 101, occurs simultaneously and is an off command, turning off the selected output terminal, that is, the output terminal connected to the selected output channel line CH j OUT, of both crosspoint switch sections 40L (step 100) and 40H (step 101). Serial bits of the received command will be loaded into the control section 20, in particular the shift register 34, through the command interface 30 as described above in connection with FIG. 2A. When the command is received in the shift register 34, the A(2:0) address lines will carry the output address section of the command to both crosspoint switch sections 40L and 40H, and the Q(A:E) lines will carry the remaining portions of the command to the program store 35. The binary-encoded signals on bus 74 from the counter 32 will enable the program store to generate the D(3:0) data signals, and the WR L/H and LATCH L/H control signals, which are connected to both crosspoint switch sections 40L and 40H in the correct timing sequence. The first command to be executed (steps 100, 101) will be an off command with both WR L and WR H signals simultaneously asserted, followed by simultaneous assertion of the LATCH L and LATCH H signals. This assertion of the control signals WR L/H and LATCH L/H for both of the crosspoint switch sections 40L and 40H occurs only in steps 100 and 101 and in the initial power-on condition, with all other commands resulting in the assertion of only the WR L/LATCH L or the WR H/LATCH H control signals. For steps 100 and 101, the effect is to simultaneously turn off the output terminal of both the crosspoint switch sections 40L and 40H connected to output channel line CH j OUT.

Following step 101, an input/output command will be processed to enable the crosspoint switch section that is connected to the CH i IN channel input line to connect its terminal connected thereto to the "j-th" output terminal (step 102). As described above, the input/output command will have an input address portion that identifies the input terminal to be connected to its "j-th" output terminal, which is identified in the output address portion of the command. It will be appreciated that the input address portion will not identify the particular input channel line CH i IN to be connected to the output channel line CH j OUT, but the input address portion together with the high/low portion will jointly identify the CH i IN input channel line. Processing of the input/output command by the control section 20 will proceed as described above, and when the program store 35 has asserted the appropriate WR L/LATCH L or WR H/LATCH H pair of control signals as described above, the appropriate crosspoint switch section 40L or 40H will effect a connection of its appropriate input terminal to the output terminal connected to the CH j OUT output line.

Following step 102, the control section 20 will process an on/off command that enables the appropriate crosspoint switch section 40L or 40H (that is, the crosspoint switch section that is connected to the "i-th" input channel line CH i IN) to turn on its "j-th" output terminal, thereby enabling that crosspoint switch section to couple signals received on the CH i IN input channel line onto the CH j OUT output channel line (step 103). This command will be similar to the on/off commands described above in connection with steps 100 and 101, except that (a) the encoding of the command portion of the command will identify the on function, and (b) only one command will be processed, namely, a command for the crosspoint switch section 40L or 40H connected to the "i-th" input channel line CH i IN, so as to ensure that both crosspoint switch sections are not coupling signals onto the same output channel line CH j OUT. Thus, at the end of step 103, the selector section 21 (FIG. 2B) will be coupling signals on the CH i IN channel input line onto the CH j OUT output channel line.

The operations described above in connection with steps 100 through 103 will be repeated in connection with each output channel line CH j OUT onto which signals from an input channel line CH i IN are to be coupled, and also to change the input channel line CH i IN whose signals are to be coupled onto an output channel line CH j OUT.

The invention provides a number of benefits. The invention provides the capability of connecting any analog signal input to any output in any combination, including multiples of the same input. For example, the "i-th" input channel line could simultaneously be connected to output channel lines CH j OUT, CH j' OUT and CH j'' OUT, where "j," "j'" and "j''" represent different values. In addition, the invention provides the capability to turn selected output terminals of the crosspoint switch sections 40L and 40H off or on. Furthermore, the crosspoint analog data selector 11 constructed in accordance with the invention is easy to operate, since a user only has to enter a single command (representing an input/output command or on/off command) to accomplish the operations described above.

It will be appreciated that numerous modifications may be made to the invention. Additional crosspoint switch sections may be provided to enlarge the number of input channel lines CH i IN which may be accommodated. It will be appreciated that additional bits may be required in the high/low portion of the command to accommodate the additional crosspoint switch sections. In addition, the particular control signals generated by the program store 35, along with their timings, will depend on the particular protocol required by the crosspoint switch sections that are selected for particular implementations of the crosspoint analog data selector 11.

The preceding description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A crosspoint analog data selector for coupling data received on a predetermined number of input channel lines onto a predetermined lesser number of output channel lines in response to commands received from a command source, the crosspoint analog data selector comprising:

a selector section comprising two or more crosspoint switch sections, each crosspoint switch section including a predetermined number of input terminals and a predetermined number of output terminals, each output terminal being individually energizable, each input terminal being connected to a different input channel line, such that none of the input channel lines are connected to input terminals of multiple crosspoint switch sections, each output terminal being connected to one of the output channel lines such that each output channel line is connected to an output terminal of one said crosspoint switch section; and a control section responsive to said commands received from said command source to enable the selector section to couple data from a selected input channel line to a selected output channel line, wherein the control section effects a connection from said selected input channel line to said selected output channel line (i) initially enabling the crosspoint switch sections to de-energize their output terminals connected to the selected output channel line, (ii) enabling the crosspoint switch section connected to the selected input channel line to connect its input terminal connected thereto to its output terminal connected to the selected output channel line, and (iii) enabling the crosspoint switch section connected to the selected input channel line to energize its output terminal connected to the selected output line.

2. A crosspoint analog data selector as defined in claim 1 in which each crosspoint switch section operates in response to control signals generated by the control section, the control section comprising:
- a command buffer for receiving and buffering each command received by said crosspoint analog data selector; and
- a program section for generating said control signals in response to the commands and a binary-encoded clocking signal, and for coupling the control signals to the selector section to control the selector section.

3. A crosspoint analog data selector as defined in claim 2 in which each command is received in the command buffer serially, and in which the control section further comprises a clocking circuit for generating said binary-encoded clocking signal and a reset circuit including a command start reset portion for resetting said clocking circuit in response to the beginning of a command.

4. A crosspoint analog data selector as defined in claim 3 in which said reset circuit further comprises a power on reset portion for sensing a power on condition and for resetting said clocking circuit in response thereto.

5. A crosspoint analog data selector as defined in claim 2 in which said command buffer includes a shift register for receiving the bits of each said command serially and providing the command in parallel form to the program section and the selector section.

6. A crosspoint analog data selector as defined in claim 1 in which the commands are selected from a plurality of command mode types, including an on/off command mode type and an input/output command mode type, wherein the control section (i) in response to a command of the on/off type enabling a crosspoint switch section identified in the command to selectively energize or de-energize an output terminal as identified in the command and (ii) in response to a command of the input/output type enabling a crosspoint switch section identified in the command to selectively connect an input terminal to an output terminal, the input and output terminals being identified in the command, thereby to couple signals from a selected input channel line onto a selected output channel line.

* * * * *